US009740404B2

United States Patent
Kiyota et al.

(10) Patent No.: US 9,740,404 B2
(45) Date of Patent: Aug. 22, 2017

(54) CONTROL APPARATUS AND CONTROL METHOD

(71) Applicant: Hitachi, Ltd., Tokyo (JP)

(72) Inventors: Yusaku Kiyota, Tokyo (JP); Tetsuhiro Gotou, Tokyo (JP); Yoshihiro Toyohara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 14/771,951

(22) PCT Filed: May 31, 2013

(86) PCT No.: PCT/JP2013/065232
§ 371 (c)(1),
(2) Date: Sep. 1, 2015

(87) PCT Pub. No.: WO2014/192144
PCT Pub. Date: Dec. 4, 2014

(65) Prior Publication Data
US 2016/0018989 A1 Jan. 21, 2016

(51) Int. Cl.
*G06F 12/02* (2006.01)
*G06F 3/06* (2006.01)

(52) U.S. Cl.
CPC ............ *G06F 3/061* (2013.01); *G06F 3/0613* (2013.01); *G06F 3/0631* (2013.01);
(Continued)

(58) Field of Classification Search
CPC .... G06F 3/0613; G06F 3/0631; G06F 3/0658; G06F 3/0673; G06F 3/061; G06F 3/0659; G06F 3/0689; G06F 3/06
(Continued)

(56) References Cited

U.S. PATENT DOCUMENTS 6,549,931 B1 * 4/2003 Amor ................... G06F 9/5066
707/999.2
2003/0051081 A1 3/2003 Maeda et al.
(Continued)

FOREIGN PATENT DOCUMENTS

JP 200385117 A 3/2003
JP 2004171172 A 6/2004
(Continued)

OTHER PUBLICATIONS

International Search Report and Written Opinion PCT/JP2013/065232 mailed Jun. 25, 2013 with its English translation (Box. No. V).

*Primary Examiner* — Pierre-Michel Bataille
(74) *Attorney, Agent, or Firm* — Mattingly & Malur, PC

(57) ABSTRACT

A control apparatus, which is configured to control a plurality of processors corresponding to a plurality of storage areas arranged at an interface for accessing the storage areas, comprises: an update unit configured to, in a case a command sequence including each command outputted to one of the storage areas is inputted, update, by each one of the processors, a load applied by a command currently being executed to the storage area corresponding to the processor; a selection unit configured to, for one command of the command sequence, based on a load applied by a command currently executed at the processor updated by the update unit, select a processor out of the processors as an allocation destination of the one command; and an output unit configured to output the one command to the processor selected by the selection unit.

8 Claims, 10 Drawing Sheets

(52) U.S. Cl.
 CPC .......... *G06F 3/0658* (2013.01); *G06F 3/0659* (2013.01); *G06F 3/0673* (2013.01); *G06F 3/0689* (2013.01)

(58) Field of Classification Search
 USPC .................................................. 711/170, 154
 See application file for complete search history.

(56) References Cited

U.S. PATENT DOCUMENTS

| | | |
|---|---|---|
| 2006/0259712 A1 | 11/2006 | Onabe et al. |
| 2007/0061518 A1 | 3/2007 | Gotoh |
| 2009/0165008 A1* | 6/2009 | Liu ....................... G06F 3/0611 718/103 |
| 2009/0257525 A1* | 10/2009 | Normark ................. G01S 19/24 375/296 |
| 2010/0251015 A1 | 9/2010 | Fukuyama |
| 2014/0136740 A1 | 5/2014 | Monji et al. |
| 2014/0201757 A1* | 7/2014 | Bird ....................... G06F 9/5016 718/104 |

FOREIGN PATENT DOCUMENTS

| | | |
|---|---|---|
| JP | 2006318152 A | 11/2006 |
| JP | 200779958 A | 3/2007 |
| JP | 2010231598 A | 10/2010 |
| WO | 2008136097 A1 | 11/2008 |
| WO | 2013001578 A1 | 1/2013 |

\* cited by examiner

CONTROL APPARATUS AND CONTROL METHOD

BACKGROUND

The present invention relates to a control apparatus configured to control an interface for processing an I/O command, and a control method therefor.

A protocol chip installed in a Host Bus Adapter (HBA) is commonly implemented with a communication processor configured to offload connection protocols, however the load applied to the HBA is steadily increasing as connection speed increases and virtual technology become more and more popular. Since the processing capacity of the communication processor in the protocol chip suffers the performance bottleneck, a method to control one fiber channel port by using multiple communication processors (e.g., see International Publication WO 2013/001578). The method according to International Publication WO 2013/001578, which includes multiple communication processors at an HBA, controls the frames received via a fiber channel in a parallel manner by multiple protocol control circuits.

However, the method according to International Publication WO 2013/001578 in which a driver for controlling the multiple communication processors operating at a host has a problem in that as the driver disperses the loads of I/O commands among the multiple communication processors arranged at the HBA, the loads are dispersed unevenly (first problem). Because of such uneven dispersion, even with the increased number of the communication processors, the improvement of the transaction performance remains obstructed.

Also, even when the loads of I/O commands are distributed evenly among the multiple communication processors, the I/O characteristic of the I/O commands to a storage apparatus, which is sequential, declines the transaction performance (second problem). Since accesses to the storage are controlled in units of blocks, performances vary depending on the I/O characteristics. What is referred to as I/O characteristics includes whether the access pattern to the storage apparatus is sequential or random.

In a sequential access a block is either read or written continuously, where as in a random access a block is read and/or written in a random manner. Even with the same amount of data being transferred, between a sequential access and a random access the number of requests to the storage to either read or write differs: for example, when the size of a block is 4 [KB] in a total of 40 [KB] of data, the number of read/write request to a disk is 1 with sequential access to the storage apparatus, whereas with random at 4 [KB], the number is 10 times.

It is a common practice to implement an algorithm to streamline the sequential accesses when a sequential read commands and write commands are sent to the storage apparatus, and thus falling apart the sequential quality causes the response performance of the storage apparatus to decline.

Also, there is another problem that when I/O commands having a smaller block size and I/O commands having a larger block size are mixed in an access to the storage apparatus, the transaction performance declines due to the I/O commands having a smaller block size (third problem). An example will be described using a case where a tape apparatus and a disk apparatus are connected via a fiber channel connected with an identical port of the HBA.

The storage controls data transfers in units called blocks. The tape apparatus controls the data transfers using larger blocks (e.g., 8 time to 64 times) with respect to the disk apparatus. Accordingly, when a request to process an I/O command to the tape apparatus and a request to process an I/O command to the disk apparatus are sent to the same communication processor, processing time for the I/O commands of the tape apparatus, which uses larger block size, increases. This will generate a wait time for processing the I/O commands of the disk apparatus, which uses smaller block size, while the both of the apparatuses use the same fiber channel, which subsequently will cause the performance thereof to deteriorate.

With respect to the third problem, a method has been available where a system design to separate the HBA with which the disk apparatus is connected from the HBA with which the tape apparatus is connected is used to ensure a communication band for the tape apparatus in order to prevent the performance bottleneck for the entire system. However, the necessity to introduce the HBA exclusively for the tape apparatus increases the introduction cost.

The third problem is not limited for the circumstance where the tape apparatus and the disk apparatus, each as the device with which connections are made, are mixed with one another, but also depends on the characteristics of the database stored at the storage apparatus. An example will be provided where a business system (OLTP) and an information system (DWH) are both arranged within a storage apparatus and connected with the same port.

OLTP refers to an online transaction processing and is a mechanism where a host and a user terminal connected with one another via a network perform a series of processes, and in general is used for data entry and retrieval transaction processing. The block size used when processing one time I/O command is small (a few kilo bytes), while high speed response performance is expected.

Now, DWH (data warehouse) is a system for analyzing vast amounts of business data, as referred to as big data in recent years, for relevancy of and among items. In DWH, I/O commands use larger block size (several tens of kilo bytes, or more) and throughput performance, rather than response performance, is expected.

As such, since OLTP uses I/O commands of smaller block size while DWH is controlled using I/O commands of larger block size, problems that are similar to the problems that arise when a disk apparatus and a tape apparatus are connected with the same port of the HBA also arise. In other words, when I/O command process for OLTP and those for DWH are requested to the same communication processor, increasing the processing time for DWH using I/O command of the larger block size causes a wait period for OLTP using I/O command of the smaller block size to generate. Accordingly, the response performance expected of OLTP declines.

SUMMARY

In order to solve the above stated problems, the present invention aims to improve the processing performance with respect to the storage apparatus.

An aspect of the invention disclosed in this application is a control apparatus configured to control a plurality of processors corresponding to a plurality of storage areas arranged at an interface for accessing the storage areas, the apparatus comprising: an update unit configured to, in a case a command sequence including each command outputted to one of the storage areas is inputted, update, by each one of the processors, a load applied by a command currently being executed to the storage area corresponding to the processor; a selection unit configured to, for one command of the command sequence, based on a load applied by a command currently executed at the processor updated by the update unit, select a processor out of the processors as an allocation destination of the one command; and an output unit configured to output the one command to the processor selected by the selection unit.

According to a representative embodiment of the present invention, it becomes possible to improve the processing performance with respect to the storage apparatus. Other objects, configurations, and effects than those described above are clarified by the following description of an embodiment.

DETAILED DESCRIPTION OF THE EMBODIMENTS

According to the present embodiment, a host is operable to determine I/O characteristics based on an I/O load per communication processor, a type of an I/O command requested to a storage apparatus, and an access address by a driver configured to control a plurality of communication processors arranged within an HBA. Also, a server has an arbitrary communication process occupancy control an I/O command to a connection LU and an I/O command of a specified block size so as to select a communication processor for processing the I/O commands.

This will allow parallel operation with no imbalance of the loads of I/O commands applied to the multiple communication processors, and improve the transaction performance of fiber channel ports. Also, when I/O commands of larger block size and I/O commands of smaller block size with respect to the storage apparatus connected with the HBA are mixed together, it will eliminate or reduce the decline in the processing performance of I/O commands having smaller block size influenced by the existing process of I/O commands having larger block size. By this, while it used to require the HBAs to be separately arranged depending on the type of storage to be connected or the characteristics of database, it is possible to group the HBAs to a single HBA, thereby reducing an introduction cost of the system. Hereinafter, embodiments of the present invention will be described with reference to drawings.

Input Output Control Example 1

Figure 1:
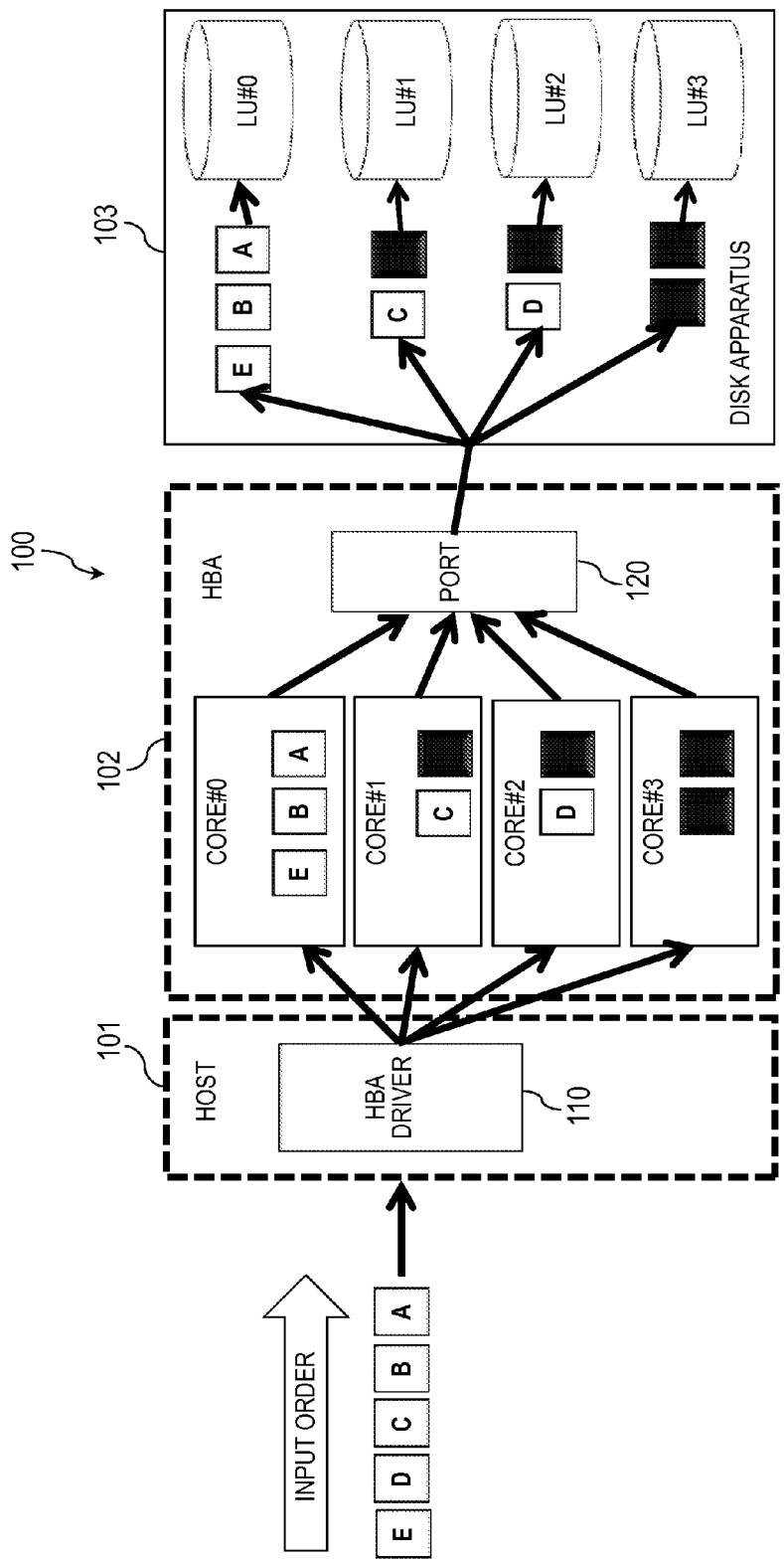
FIG. 1 is an explanatory diagram illustrating an input output control example 1 by a host according to the present embodiment.

FIG. 1 is an explanatory diagram illustrating an input output control example 1 by a host according to the present embodiment. The input output control example 1 is configured to improve the transaction performance via a load balancing method that distributes the load of I/O commands evenly among a plurality of communication processors arranged at an HBA.

In FIG. 1, a communication system 100 includes a host 101, an HBA 102, and a disk apparatus 103. The host 101 includes an HBA driver 110 configured to control the HBA 102. The HBA 102 includes a plurality of cores, #0 through #3, and a port 120, and transfers I/O commands to the disk apparatus 103. While the present embodiment includes, as an example, 4 units of cores, however, the present invention is not limited thereto; it requires at least 2 units of cores included therein. I/O commands A through E are to be inputted to the host 101 in an alphabetical order.

The disk apparatus 103 includes a plurality of logical units, LU#0 through LU#3. While the present embodiments include, as an example, 4 logical units, however, the present invention is not limited thereto; it requires at least 2 logical units. Also note that the number of the logical units does not need to match the number of the cores.

The host 101 refers to the status of the load on the plurality of cores #0 through #3, and selects the core to which the I/O commands A through E will be allocated. Note that the black rectangles shown in the cores #0 through #3 indicate the I/O commands that were inputted prior to the I/O commands A through E. The HBA driver 110 allocates the I/O command A to the core #0 which has the least number of preceding I/O commands. Next, the HBA driver 110 allocates the I/O command B to one of the cores #0 through #2 having the least number of preceding I/O commands. Note that when there are multiple destination candidates for allocation, the core having the smallest reference number shall be selected.

Next, the HBA driver 110 allocates the I/O command C to the core #1 that has the least number of preceding I/O commands, and then allocates the I/O command D to the core #1 that has the least number of preceding I/O commands. As such, since the larger the number of I/O commands that are currently being executed, the greater the load applied to the core becomes, the HBA driver selects the core having the least number of I/O commands currently being executed thereat, and outputs the I/O command thereto. By uniformly dispersing the I/O command load among the communication processors arranged at the HBA, it becomes possible to improve the transaction performance.

Input Output Control Example 2

Figure 2:
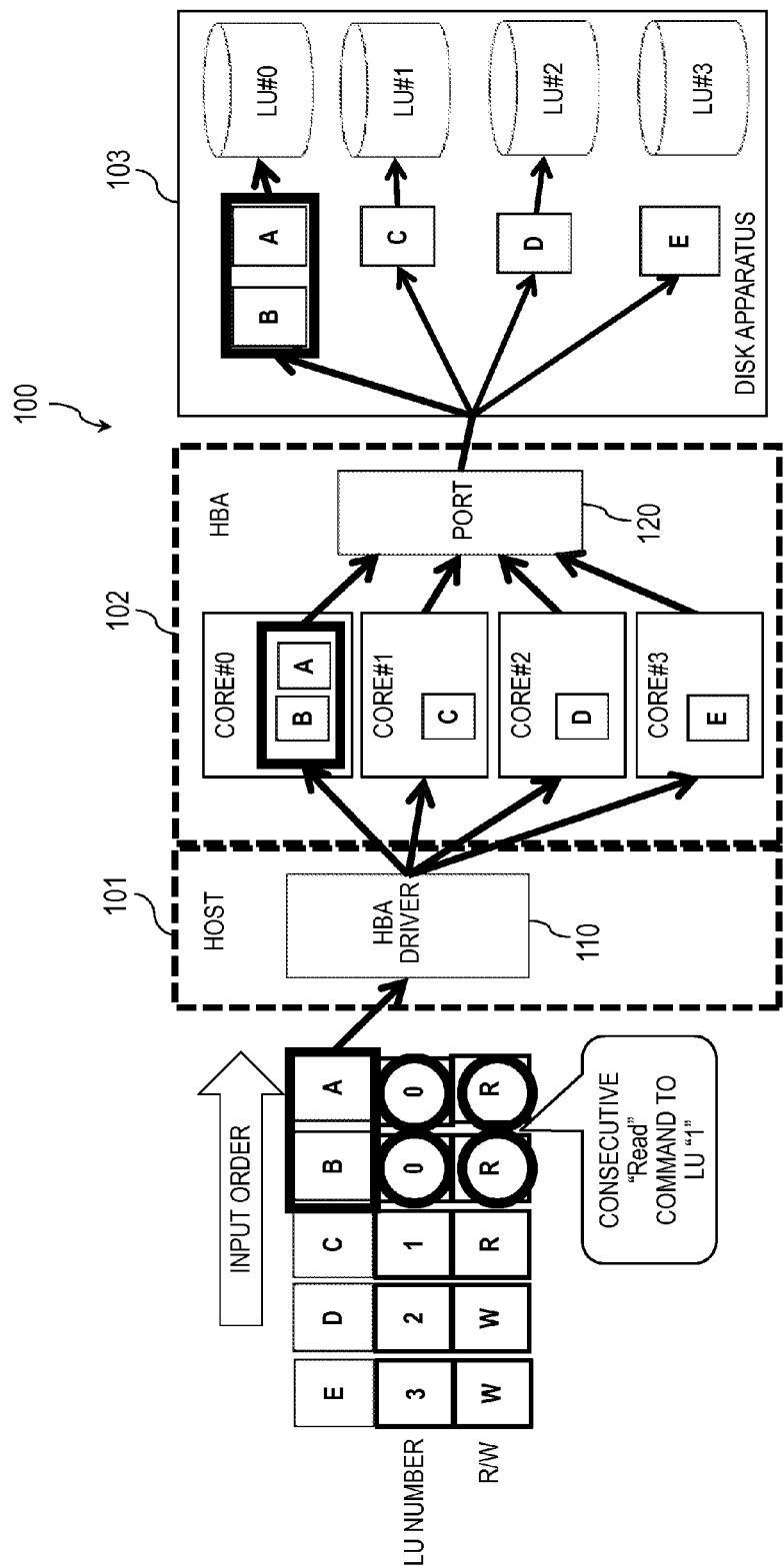
FIG. 2 is an exemplary diagram illustrating an input output control example 2 by the host according to the present embodiment.

FIG. 2 is an exemplary diagram illustrating an input output control example 2 by the host according to the present embodiment. The input output control example 2 is configured to improve the transaction performance when the I/O characteristics of the I/O command to the storage apparatus is sequential.

Note that according to FIG. 2 the I/O commands A through E are inputted in an alphabetical order to the host 101. Note that the same reference numerals as those for the commands are used for the data within the commands. For example, data at the command A will be data A. Data is associated with an LU number and an R/W. Here, a combination of an LU number and an R/W comprise one I/O command.

The LU number includes identification information configured to uniquely specify the logical unit within the disk apparatus 103, which includes an access destination of the data associated with the LU number. For example, the I/O command whose LU number includes "0" will be outputted to the logical unit LU #0 of the disk apparatus 103. The R/W includes an access type indicating whether the I/O command includes a read command or a write command.

The HBA driver 110 fetches the I/O commands in the order of I/O command A to I/O command E. The HBA driver 110 judges the continuity of the I/O commands that are continuous and the identity of access types. As for the continuous I/O commands (A and B), each command includes an access type "R" (read). When the HBA driver 110 determines the addresses to which an access is made are continuous, the continuous I/O commands (A and B) will be processed by the same core. According to the present example, the HBA driver 110 passes the continuous I/O commands (A and B) to the core #0, and the core #0 transfers, via the port 120, the continuous I/O commands (A and B) to the logical unit LU #0 in the order of I/O command A and I/O command B.

Further, the HBA driver 110 makes the same judgment with respect to the continuous I/O commands (B and C), (C and D), and (D and F). The HBA driver 110 allocates the I/O command C to the core #1, the I/O command D to the core #2, and the I/O command E to the core #3 according to the load balancing method illustrated in FIG. 1.

Then, the core #1 transfers the I/O command C to the logical unit LU #1; the core #2 transfers the I/O command D to the logical unit LU #2; and the core #3 transfers the I/O command E to the logical unit LU #3. This makes it possible to operate in a parallel manner with no imbalance of the I/O commands applied among the plurality of cores, and to improve the transaction performance of the port 120.

Input Output Control Example 3

Figure 3:
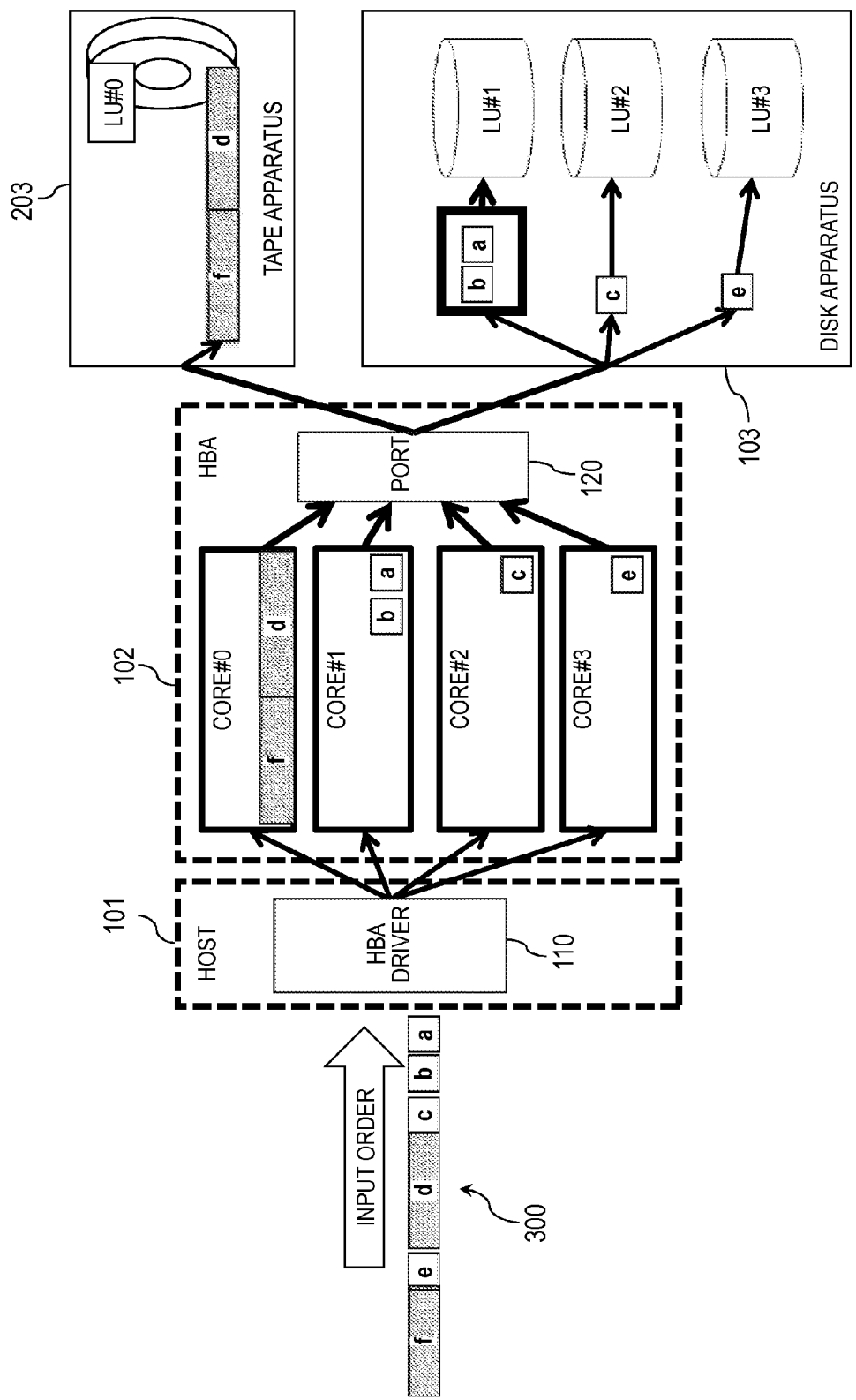
FIG. 3 is an explanatory diagram illustrating an input output control example 3 by the host according to present embodiment.

FIG. 3 is an explanatory diagram illustrating an input output control example 3 by the host 101 according to the present embodiment. The input output control example 3 is configured to improve the transaction performance of an I/O command having a smaller block size when an I/O command having a smaller block size and an I/O command having a larger block size are mixed concerning an access to the storage apparatus. The input output control example 3, as an example of the storage apparatus, will be described with an example in which a tape apparatus 303 and the disk apparatus 103 are connected with one another via a fiber channel switch (not illustrated) which is connected with the port 120 of the HBA 102. Note that the tape apparatus 303 may be replaced with an information system (DWH), while the disk apparatus 103 may be replaced with a business system (OLTP).

According to FIG. 3, the core #0 is the communication processor that is occupied to the tape apparatus 303, while the cores #1 through #3 are the communication processors that are occupied to the disk apparatus 103. Of a sequence of I/O commands 300, the I/O commands a through c, and e each have a smaller block size, while the I/O commands d and f each have a larger block size.

The HBA driver 110 of the host 101 selects the cores which will be the transfer destinations for the I/O commands a through f which are inputted thereto in a sequential manner. Since the tape apparatus 203 controls the data transfer using larger (i.e., 8 times to 64 times) block size with respect to the disk apparatus 103, the HBA driver 110 transfers the I/O commands d and f in said order to the core #0.

As such, it becomes possible, when the I/O commands having a larger block size and the I/O commands having a smaller block size are mixed together, to improve the processing performance of the I/O commands having the smaller block size which is influenced negatively due to the processing of the I/O commands having the larger block size. Accordingly, the HBA 102, which required to be divided into multiple pieces in accordance with the type of connected storage or data base characteristics, can be grouped together in a single piece, which enables the introduction cost of the system to be reduced.

Also, the HBA driver 110 distributes the I/O commands a through c, and e to the core #1 through core #3. At this point, the cores to which the I/O commands are distributed are selected in accordance with the LU number designated in the I/O commands a through c, and e. Also, as illustrated with the input output control example 2 in FIG. 2, the HBA driver 110 selects the same cores as the distribution destination in accordance with the continuity of the continuous I/O commands and the identity of access type.

For example, when the continuous I/O commands (a and b) both include the continuity in the address that they both access, and the access type is "R" (read), the continuous I/O commands (a and b) will be transferred to the core #1 which corresponds to the logical unit LU #1. This makes it possible to operate in a parallel manner with no imbalance of the I/O commands applied among the plurality of cores and to improve the transaction performance of the port 120.

<Hardware Configuration Example of Communication System 100>

Figure 4:
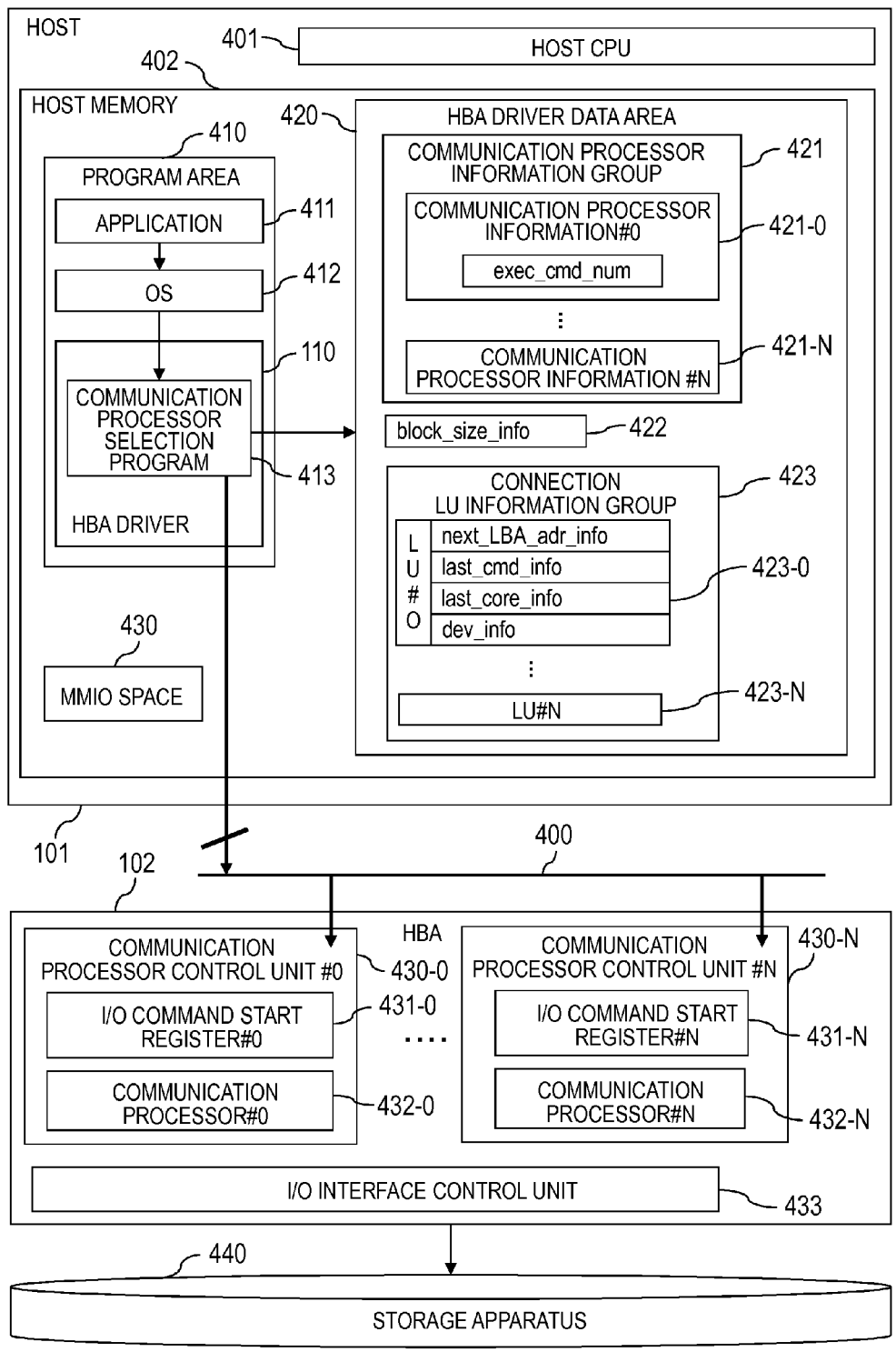
FIG. 4 is a block diagram illustrating an example of a hardware configuration of the communication system.

FIG. 4 is a block diagram illustrating an example of a hardware configuration of the communication system 100. The communication system 100 includes the host 101, the HBA 102, and a storage apparatus 440. The host 101 and the HBA 102 are connected with one another via a PCI bus, and the HBA 102 is further connected with the storage apparatus 440 via an I/O interface control unit 433 (corresponding to the port 120). The storage apparatus 440 includes one or more storage areas. The storage area refers to an area where data will be read or written in accordance with the I/O command.

For example, when the storage apparatus 440 is the disk apparatus 103, it will include one or more logical disks as illustrated in FIG. 1. Also, the storage apparatus 440 may include one or more tape apparatuses 303. Also, a storage apparatus 340 may include, as illustrated in FIG. 2, a configuration where the disk apparatus 103 and the tape apparatus 303 are included. Also, the storage apparatus 340 may include the storage apparatus 340 that is arranged within an information system (DHW) or a business system (OLTP). Note that the host 101 regards the storage apparatus 340, which will be the access destination, as a logical unit whether the type of the storage apparatus 340 is a physical disk apparatus 103 or a tape apparatus 303.

The host 101 includes a host Central Processing Unit (CPU) 401 and a host memory 402. The host CPU 401 controls the host 101. The host memory 402 includes a work area for the host CPU 401. Also, the host memory 402 includes a non-temporary storage medium configured to store various types of programs and data. The host memory may include a Read Only Memory (ROM), a Random Access Memory (RAM), an Hard Disk Drive (HDD), or a flash, for example.

The host memory includes a program area 410, an HBA driver data area 420, and an MMIO space 430. The program area 410 stores an application 411, an Operating System (OS) 412, and the HBA driver 110, which are executed by the host CPU 301. Also, the HBA driver 110 includes a communication processor selection program 413.

The HBA driver area 420 stores a communication processor information group 421, a connection LU information group 423, and block size information (block_size_info) 422. The communication processor information group 421 includes communication processor information 421-0 through 421-N per communication processor. The communication processor information refers to the information configured to manage the corresponding communication processor out of the communication processor group at the HBA 102. To be more specific, the communication processor information 421-0 through 421-N include the number of commands currently being executed (exec_cmd_num). The number of commands currently being executed (exec_cmd_num) includes the number of I/O commands that are currently being processed. The greater the number of commands currently being executed (exec_cmd_num) is, the greater the load is being applied to the communication processor.

The connection LU information group 423 includes the connection LU information 423-0 through 423-N per logical unit. The connection LU information 423-0 through 423-N refers to the information configured to control the logical unit. To be more specific, the connection LU information 423-0 through 423-N may include last command information (last_cmd_info), continuity determination information (next_LBA_adr_info), occupancy allocation information (dev_info), and last core information (last_core_info), for example.

The last command information (last_core_info) includes the information configured to indicate whether the access type of the I/O command executed with respect to the logical unit included writing (W) or reading (R).

The continuity determination information (next_LBA_adr_info) includes the information used to determine whether or not the access pass to the logical unit is sequential. To be more specific, the continuity determination information (next_LBA_adr_info) may include the sum of the access address for the logical unit and the block size of the I/O command gaining access thereto, for example.

The occupancy allocation information (dev_info) includes management information configured to exclusively allocate the control of the I/O command to a transfer destination logical unit to a specified communication processor. To be more specific, the occupancy allocation information (dev info) may include the identification information configured to uniquely specify the specified communication processor that is exclusively allocated, for example.

The occupancy allocation information (dev_info) includes a parameter that an operator sets to an HBA driver data area 320 via the application 411 when the operator introduces the communication system 100.

The last core information (last_core_info) includes the information for managing the communication processor that last activated the I/O command addressed to the logical unit. To be more specific, the core information (last_core_info) may include the identification information configured to uniquely specify the communication processor that last activated the last I/O command addressed to the LU, for example.

The block size information (block_size_info) 422 includes the information configured to have the communication processor, which controls the I/O command, occupied in accordance with the block size. To be more specific, the block size information (block_size_info) 422 may include the block size of the I/O command which is correlated to the communication processor, for example.

The MMIO space 430, which stands for Memory Mapped Input Output space, includes an address space where the HBA driver 110 gains access to a register within the I/O device such as the HBA 102.

The HBA 102 includes a plurality of communication processor control units 430-0 through 430-N. The communication processor control units 430-0 through 430-N access corresponding logical units via the I/O interface control unit 433. The communication processor control units 430-0 through 430-N include I/O command start registers 431-1 through 431-N, and communication processors 432-0 through 432-N. The I/O command start registers 431-1 through 431-N retain the I/O commands from the HBA driver 110. Next, an internal configuration of the HBA 102 will be described below.

Figure 5:
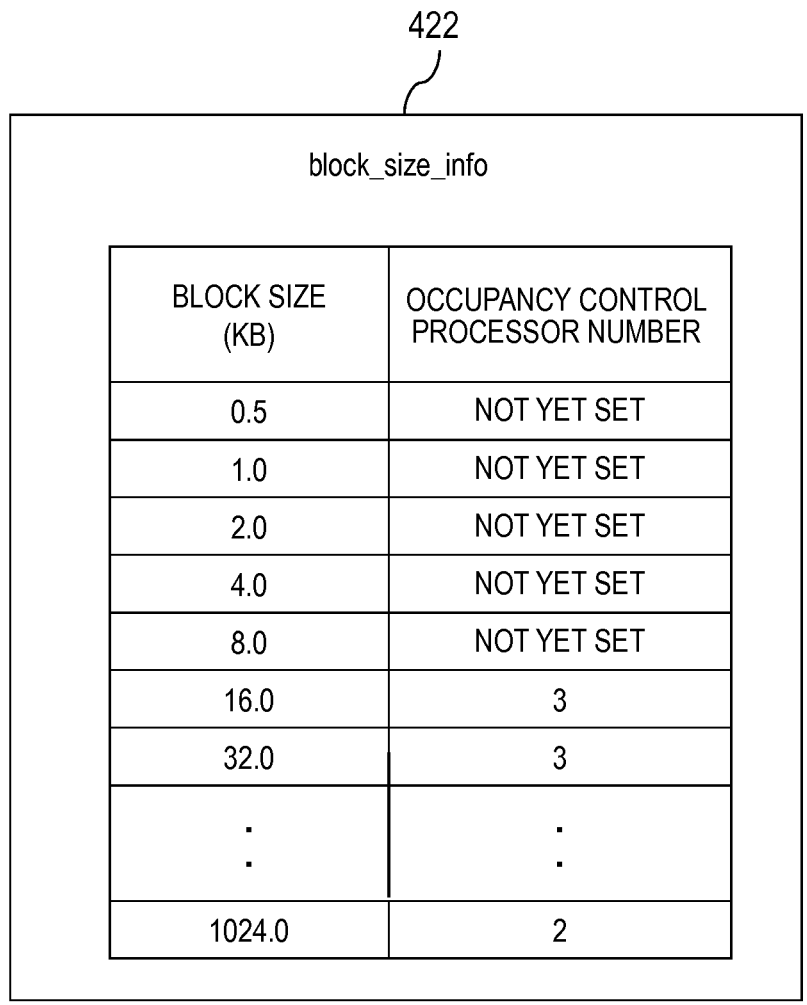
FIG. 5 is an explanatory diagram illustrating an example of a stored content of the block size information (block_size_info).

FIG. 5 is an explanatory diagram illustrating an example of a stored content of the block size information (block_size_info) 422. The block size information (block_size_info) 422 includes the information which correlates the block size with an occupancy control processor number. The block size refers to the block size of the communication processor. The occupancy control processor number refers to the number of the communication processor that occupancy controls I/O commands. The communication processor that occupancy controls I/O commands refers to the communication processor which will be selected when the I/O command having a corresponding "BLOCK SIZE" is received. For example, when the block size of an I/O command is 16 [KB], the communication processor #3 is the communication processor that will be occupancy controlled. Accordingly, the destination to which this I/O command will be sent is the communication processor #3. Also, "NOT YET SET" indicates the communication processor that will be occupancy controlled.

Figure 6:
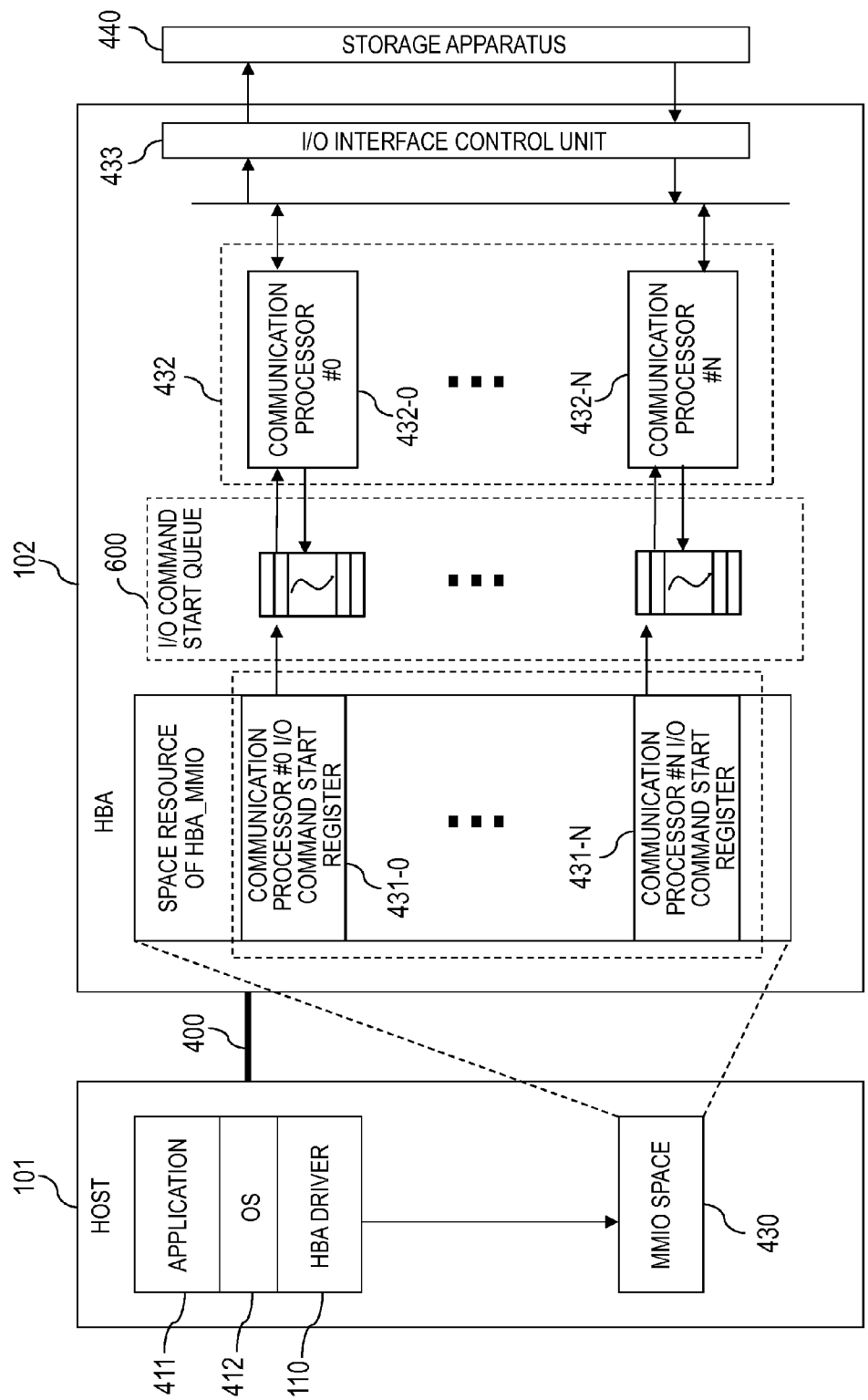
FIG. 6 is an explanatory diagram illustrating the detailed configuration of the HBA.

FIG. 6 is an explanatory diagram illustrating the detailed configuration of the HBA 102. The I/O command start registers 431-0 through 431-N are mapped to the MMIO space 430. This enables the HBA driver 110 to access the I/O command start registers 431-0 through 431-N and to give an I/O command execution instruction to the communication processor.

The HBA 102 stacks the I/O commands instructed by the HBA driver 110 at an I/O command start queue 600 per communication processor, and gives a notification with respect to the communication processor group 432 to start the I/O command. Then, the communication processor group 432 sends the I/O command to the storage apparatus 440 via the I/O interface control unit 433.

<Functional Configuration Example of Host 101>

Figure 7:
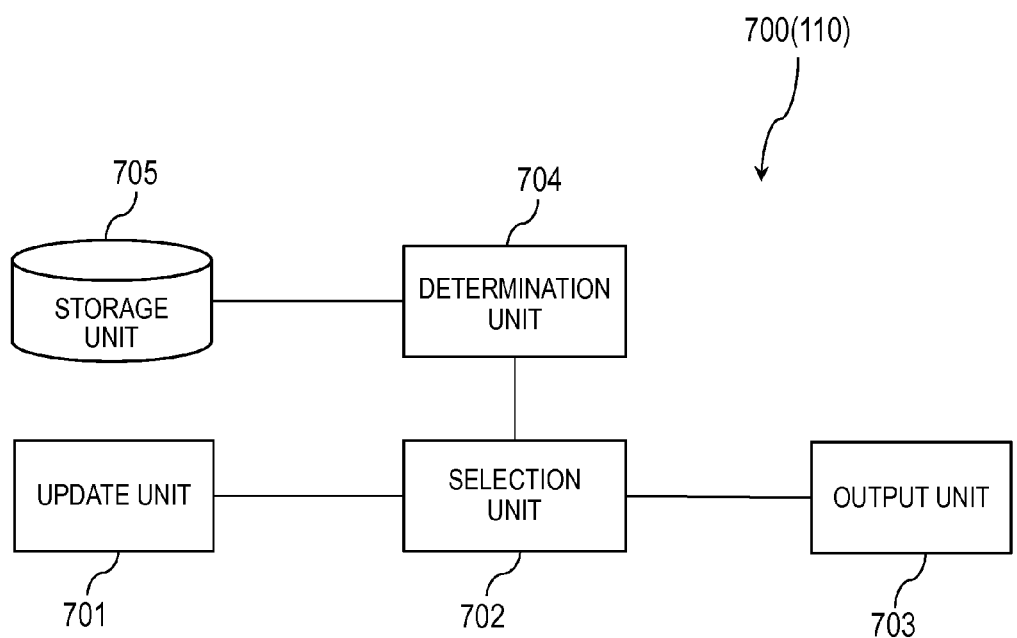
FIG. 7 is a block diagram illustrating an example of a functional configuration of the host.

FIG. 7 is a block diagram illustrating an example of a functional configuration of the host 101. A control apparatus 700, which corresponds to the host 101, includes a control apparatus configured to control a plurality of processors corresponding to each of a plurality of storage areas arranged at the interface that is configured to access the storage areas. These storage areas refer to storage areas within the storage apparatus 440, which corresponds, for example, to the logical unit of the disk apparatus 103 or the tape apparatus 303. These processors include, for example, the communication processor group 432; and the interface that is configured to access the storage areas refer, for example, to the HBA 102 having the communication processor group 432.

The control apparatus 700 includes an update unit 701, a selection unit 702, an output unit 703, a determination unit 704, and a storage unit 705. The features of the update unit 701 to the determination unit 704 are realized, to be more specific, by having the host CPU 401 execute the HBA driver 110 illustrated in FIG. 4, for example. Also, the features of the storage unit 705 are realized by the host memory 402.

The update unit 701, when a sequence of commands which is outputted to each of the storage areas is inputted thereto, updates the load of the command that each of the processors is currently executing with respect to the storage area that corresponds to the processor. To be more specific, the update unit 701 may update the number of commands (exec cmd_num) currently being executed that are stored at each piece of the communication processor information 321-0 through 321-N of the communication processor information group 421, for example. That is, when issuing an I/O command to the communication processor, the update unit 701 increments by one the number of commands (exec_cmd_num) currently being executed and when receiving an end notification from the communication processor, the update unit 701 decrements by one the same.

The selection unit 702, with respect to any one of the commands in the sequence of commands, selects a processor out of the processors, to which any one of the commands will be allocated, based on the load of the command currently being executed for each processor which was updated by the update unit 701. To be more specific, the selection unit 702 may select the communication processor that has the smallest number of the commands (exec_cmd_num) that are currently being executed as the allocation destination, for example.

The output unit 703 outputs any one of commands to the processor selected by the selection unit 702. To be more specific, the output unit 703 may, by the I/O interface control unit, send the I/O command to the logical unit that corresponds to the communication processor of the allocation destination, for example.

The determination unit 704 determines with respect to the first command and the second command, which is immediately after the first command, of the sequence of commands as to whether the address accessing any one of the storage areas includes continuity or whether or not the access type is the same. To be more specific, the determination unit 704 may make a determination concerning the continuity of the continuous I/O commands and the identity of access type, for example.

To be more specific, the determination unit 704 may make a comparison between the continuity determination information (next_LBA_adr info) of the first command which is the preceding command of continuous I/O commands and the address to which the second command, which follows the preceding command of the continuous I/O commands, accesses, for example. The continuity determination information (next_LBA_adr_info) refers to the sum of the address for accessing the logical unit and the block size of the I/O commands that gains the access. When the result of the comparison matches, the determination unit 704 determines the first command and the second command include the continuity between one another.

Also, the determination unit 704 refers to the last command information (last_core_info) so as to identify whether the access type of the first command includes writing (W) or reading (R), and whether it matches the access type of the second command. When it is determined it matches, the determination unit 704 determines that the first command and the second command include the same access type.

In this case, the selection unit 702 will not select an allocation destination for the second command based on the number of the commands (exec_cmd_num) currently being executed. Then, when it is determined by the determination unit 704 that the address being accessed includes continuity and the access types are the same, the selection unit 702 selects the processor that corresponds to the storage area to which the first command gained access out of the plurality of processors. For example, when the access destination of the first command includes the logical unit #0, the access destination of the second command becomes the logical unit #0. Note, however, that when the address includes no continuity, or when the access types are not the same, the selection unit 702 will select the allocation destination of the second command based on the number of the commands (exec_cmd_num) currently being executed.

The storage unit 705 stores therein first association information which correlates the identification information of the processor that is specified out of the processors with the identification information of the storage area specified out of the storage areas including the access destination of the specified processor. The first association information refers to the occupancy allocation information (dev_info) within the connection LU information 423-0 through 423-N. That is, the identification information of the specified processor includes the number for the logical unit that is specified by the connection LU information 423-0 through 423-N, while the identification information of the specified storage area refers to the number for the communication processor that is stored at the occupancy allocation information (dev_info).

When using the first association information, the determination unit 704 refers to the first association information to determine whether or not the identification of the storage area including the access destination of the second command retained at the second command matches the identification information of the specified storage area. Then, when it is determined by the determination unit 704 that the identification information of the storage area including the access destination of the second command matches the identification information of the specified storage area, the selection unit 702 selects the specified processor.

For example, when the access destination of the second command which follows the preceding command of the continuous I/O commands includes the logical unit #0, and when the specified storage area includes the logical unit #0, the selection unit 702 selects as the allocation destination of the second command the communication processor which is designated by the number for the communication processor stored at the occupancy allocation information (dev_info) of the connection LU information 423-0 of the logical unit #0.

Also, the storage unit 705 stores therein second association information which correlates the identification information of the processor that is specified out of the processors with the size of the command outputted to the access destination by the specified processor. The second association information refers to the block size information (block_size_info) 422.

When using the second association information, the determination unit 704 refers to the second association information to determine whether or not the size of the second command matches the size of the command outputted by the specified processor to the access destination. Then, when it is determined by the determination unit 704 that the size of the second command matches the size of the command outputted by the specified processor to the access destination, the selection unit 702 selects the specified processor.

For example, when the block size of the second command which follows the preceding command of the continuous I/O commands includes 16.0 [KB], and when the number for the communication processor which corresponds, according to the block size information (block_size_info) 422, to the block size of 16.0 [KB] includes "3," the selection unit 702 selects as the allocation destination of the second command the communication processor #3.

<Sequence for Communication System 100>

Figure 8:
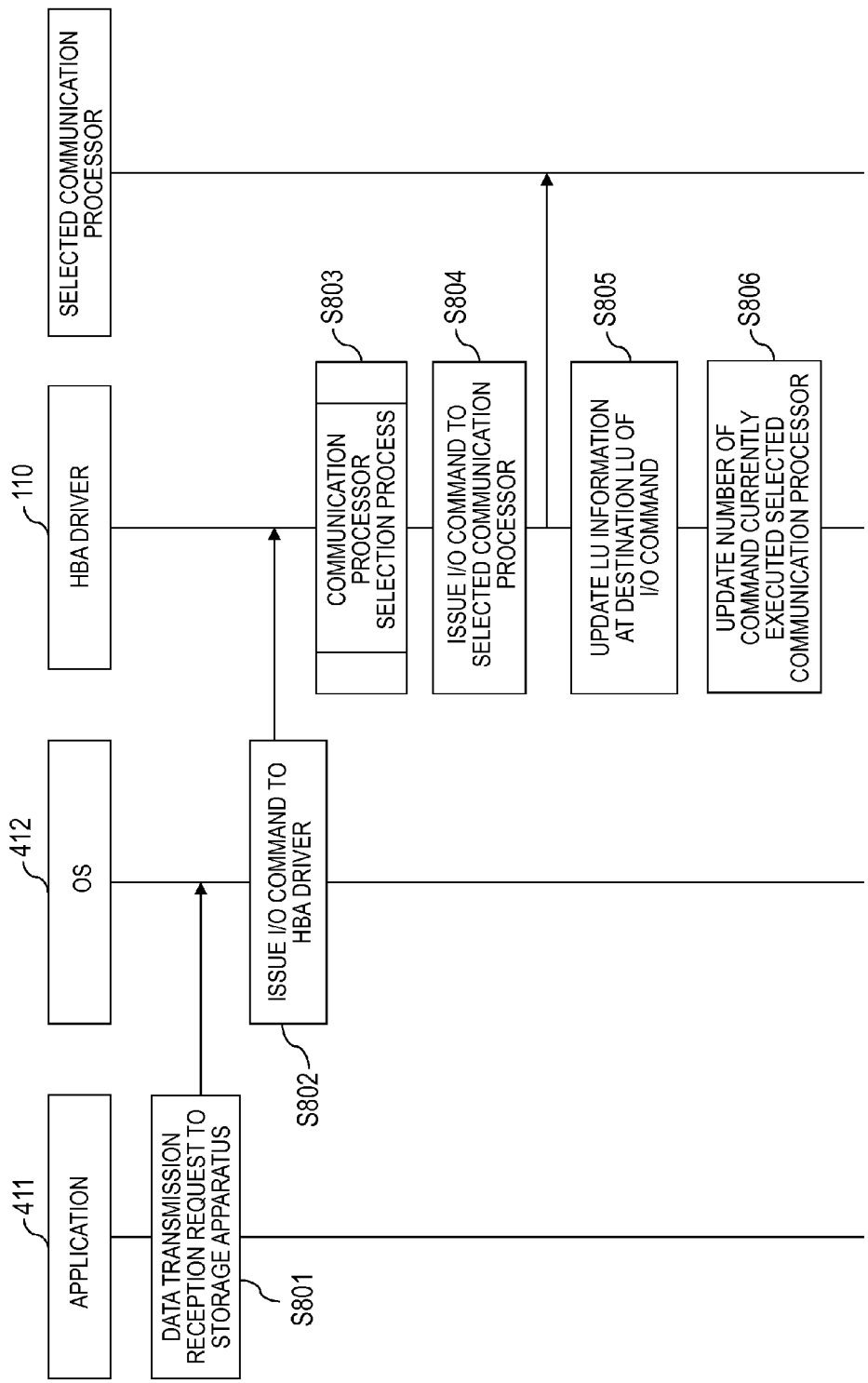
FIG. 8 is an explanatory diagram illustrating a sequence for the communication system.

FIG. 8 is an explanatory diagram illustrating a sequence for the communication system 100. It should be noted that when the description herein includes a program such as the application 411, OS 412, or the HBA driver 110 as the subject thereof, it is understood that such description equates to the description, which includes the host CPU 401 as the subject thereof, since each program herein is executed as the host CPU 401 executes a predetermined process by using the host memory 402.

Firstly, the application 411, with respect to the OS 412, executes a transmission/reception request to the storage apparatus 440 (Step S801). Upon receiving the request, the OS 412 issues an I/O command to the HBA driver 110 (Step S802). The communication processor selection program 413 of the HBA driver 110 executes a communication processor selection process configured to start the I/O command (Step S803). Note that the communication processor selected in the process of Step S803 will be referred to as a "selected communication processor." The details of the communication processor selection process (Step S803) will be described below with reference to FIG. 7.

The HBA driver 110 issues via the output unit 703 the I/O command to the selected communication processor (Step S804). After issuing the I/O command, the HBA driver 110 updates via the update unit 701 the continuity determination information (next_LBA_adr_info), the last command information (last_cmd_info), and the last core information (last_core_info) included in the connection LU information at the transfer destination logical unit of the I/O command (Step S805).

To be more specific, the continuity determination information (next LBA_adr_info) will be updated as the sum of the access address and the access block size concerning the logical unit. The last command information (last_cmd_info) will be updated as the control information which indicates as writing (W) when the I/O command issued at Step S804 includes writing or as reading (R) when the I/O command issued at Step S804 includes reading. The last core information (last_core_info) will be updated as the number for the selected communication processor which was selected during the communication processor selection process (Step S803).

Then, the HBA driver 110 updates the number of the I/O commands that are currently being executed at the selected communication processor (Step S806). To be more specific, the number of I/O command issued in Step S804 (i.e., 1 command) is added to the number of commands currently being executed (exec_cmd_num) which indicates the number of the I/O commands that are currently being executed at the selected communication processor. Note that when an I/O command completion notice is received from the selected communication processor, the number of commands currently being executed (exec_cmd_num) is subtracted.

Figure 9:
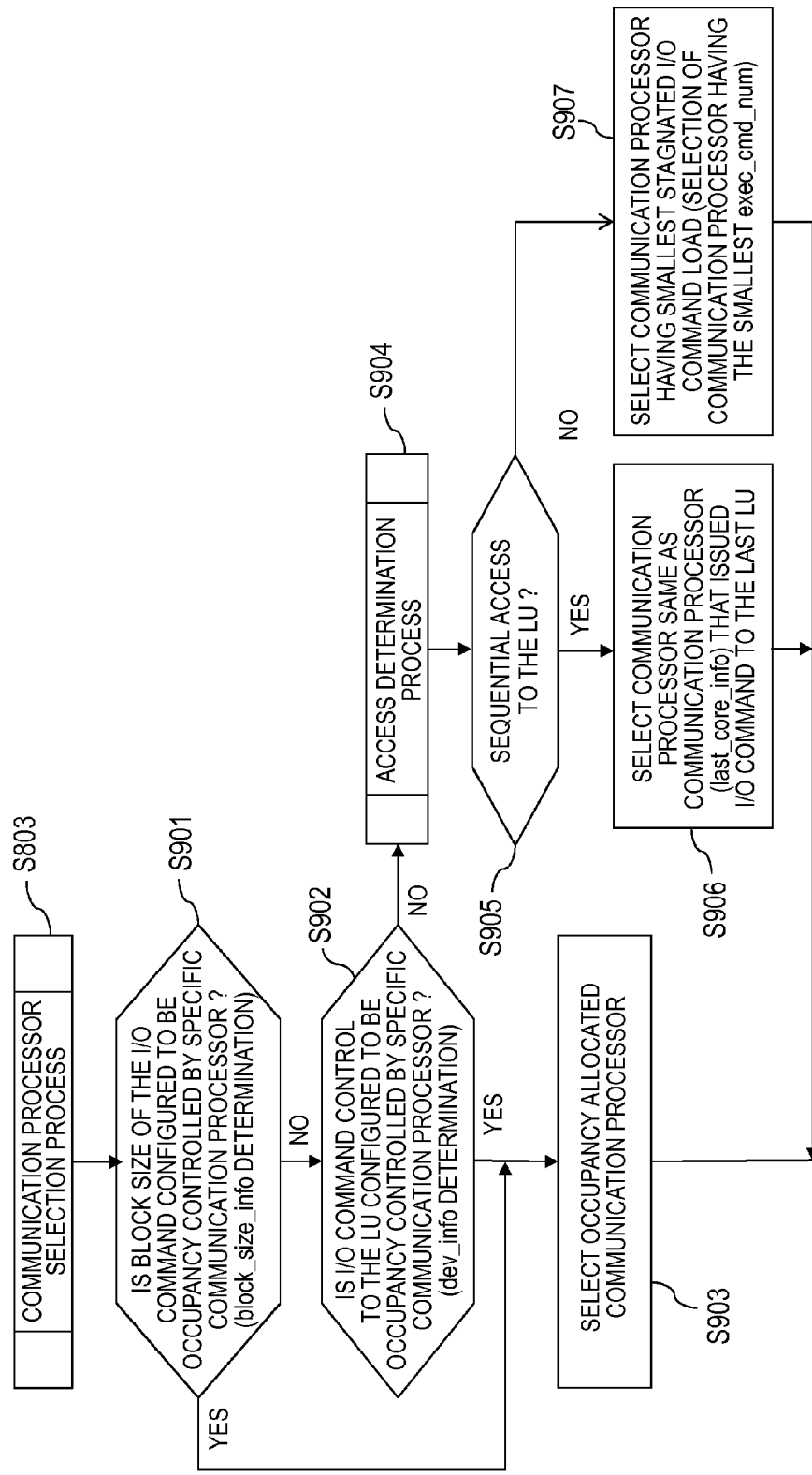
FIG. 9 is a flowchart illustrating a detailed example of the procedure of the communication processor selection process (Step S803) illustrated in FIG. 8.

FIG. 9 is a flowchart illustrating a detailed example of the procedure of the communication processor selection process (Step S803) illustrated in FIG. 8. Firstly, the HBA driver 110 has the determination unit 704 determine whether or not the block size of the I/O command (hereinafter, start command) which was issued from the OS 412 in Step S802 is configured to be occupancy controlled by a specific communication processor (Step S901). To be more specific, the HBA driver 110 may refer to the block size information (block_size_info) illustrated in FIG. 4 so as to make the determination, for example.

That is, when the occupancy control processor number corresponding to the block size includes "NOT YET SET," No will be selected at Step S901; and when the occupancy control processor number includes a number, Yes will be selected at Step S901. When Yes is selected at Step S901, the process proceeds to Step S903, where HBA driver 110 has the selection unit 702 select the communication processor for the occupancy control processor number (Step S903).

When No is selected at Step S901, the HBA driver 110 has the determination unit 704 determine whether or not the transfer destination logical unit for the start command is configured to be occupancy controlled by the specific communication processor (Step S902). To be more specific, the HBA driver 110 may refer to the occupancy allocation information (dev info) to make the determination, for example. That is, when the occupancy allocation information (dev_info) of the transfer destination logical unit includes "NOT YET SET" for the occupancy control processor number, No will be selected at Step S902; and when the occupancy control processor number includes a number, Yes will be selected at Step S902. When Yes is selected at Step S902, the process proceeds to Step S903, where HBA driver 110 has the selection unit 702 select the communication processor for the occupancy control processor number (Step S903).

The LU connected with the HBA 102 includes the disk apparatus 103 and the tape apparatus 203. The HBA driver 110 exclusively allocates the I/O command control with respect to the LU of the tape apparatus 203 to the specified communication processor. This allows the HBA driver 110 to prevent performance deterioration which would occur when the tape apparatus 203 and the disk apparatus 103 are connected with the single HBA driver 102.

When No is selected at Step S902, the HBA driver 110 has the determination unit 704 execute an access determination process (Step S904). While the details of the access determination process (Step S904) will be described below with reference to FIG. 8, during the access determination process (Step S904), a determination will be made as to whether or not the access to the transfer destination logical unit is sequential.

When the access to the transfer destination logical unit is sequential (Step S905: Yes), the process proceeds to Step S906; and when the access to the transfer destination logical unit is not sequential (Step S905: No), the process proceeds to Step S907.

When the access is sequential (Step S905: Yes), the HBA driver 110 has the selection unit 702 refer to the last core information (last_core_info), specify the communication processor that last issued an I/O command to the transfer destination logical unit, and select the communication processor (Step S906).

On the other hand, when the access is not sequential (Step S905: No), the HBA driver 110 has the selection unit 702 select the communication process having the smallest load of the stagnated I/O commands out of the communication processors (Step S907). For example, the selection unit 702 selects the communication processor having the smallest number of commands currently being executed (exec_cmd_num).

Figure 10:
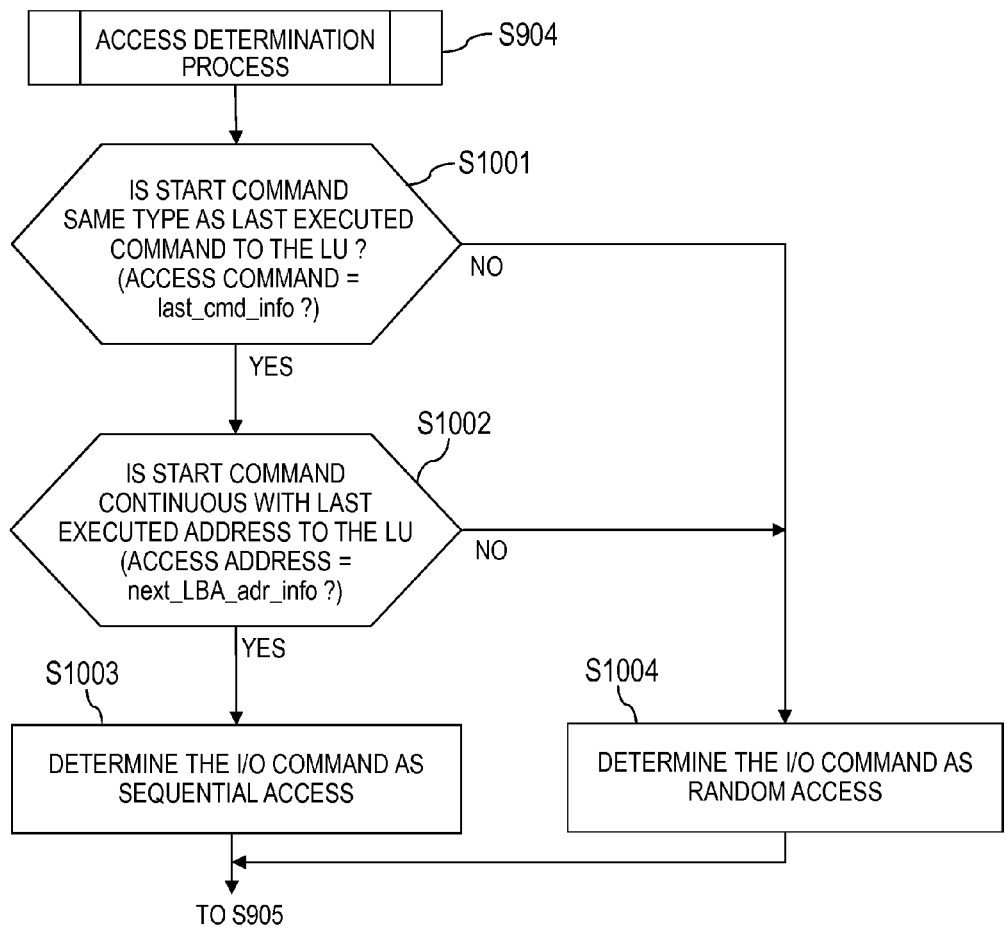
FIG. 10 is a flowchart illustrating a detailed example of the procedure of the access determination process (Step S904) illustrated in FIG. 9.

FIG. 10 is a flowchart illustrating a detailed example of the procedure of the access determination process (Step S904) illustrated in FIG. 9. Firstly, the HBA driver 110 has the determination unit 704 determine whether or not the start command is the same type as the type of access last executed with respect to the transfer destination logical unit (Step S1001). To be more specific, the HBA driver 110 determines whether or not the access type of the start command matches the access type specified by the last command information (last_cmd_info). When the types do not match (Step S1001: No), the HBA driver 110 determines that the start command includes a random access (Step S1004), which makes the process to proceed to Step S1004.

On the other hand, when the types match (Step S1001: Yes), since the access type is a sequential access, the HBA driver 110 has the determination unit 704 determine whether or not the start command is continuous with the address last executed at the transfer destination logical unit (Step S1002). To be more specific, the HBA driver 110 determines whether the continuity determination information (next_LBA_adr_info) matches the address of the start command by referring to the continuity determination information (next_LBA_adr_info) which is calculated from the address and the block size of the I/O command last executed to the transfer destination logical unit.

When the types match (Step S1002: Yes), the HBA driver 110 has the determination unit 704 determine that the start command includes the sequential access (Step S1003); and when the types do not match (Step S1002: No), the HBA driver 110 has the determination unit 704 determine that the start command includes the random access (Step S1004). After Step S1003 and Step S1004, the process proceeds to Step S905 and ends the access determination process (Step S904).

Note that although Step S1002 explains that the continuity determination information (next_LBA_adr_info) matches the address of the start command, a sequential access determination algorithm at the storage apparatus 440 may operate when the access addresses are not continuous.

For example, when within the scope of a few to several hundred bytes from the continuity determination information (next_LBA_adr_info), the storage apparatus 440 may operate assuming it is a sequential access. Accordingly, the address determination method by the HBA driver 110 may determine it to be a sequential access as long as the deviation of the address is within said scope. Also, this scope of the deviation of the address may be parameterized so as to allow a method to be adjustable in accordance with the sequential algorithm of the storage apparatus 440 which connects the HBA 102.

According to the present embodiment, the HBA driver 110 which controls the HBA 102 determines I/O characteristics by the I/O load per communication processor and the type of access to the storage apparatus 440, the access address, and the block size, so as to select the communication processor to start an I/O command. This allows the HBA 102 to improve the transaction performance. Also, the HBA 102 has a specified communication processor to occupancy control the I/O command process to the LU which connects the specified communication processor. This method achieves data transmission without bottleneck performance.

Note that the present invention is not limited to the above described embodiment, and may include various modifications. For example, the above described embodiment was described into details in order to facilitate the understanding of the present invention, but the present invention is not limited to the configuration in which all the elements described above are arranged. Also note that the procedural orders described with reference to FIG. 6 through FIG. 8 may be changed as needed.

This invention has been described in detail so far with reference to the accompanying drawings, but this invention is not limited to those specific configurations described above, and includes various changes and equivalent components within the gist of the scope of claims appended.

What is claimed is:

1. A control apparatus configured to control a plurality of processors, corresponding to a plurality of storage areas that are arranged at an interface, for accessing the storage areas, the apparatus comprising:
   a memory storing respective load information for each of the plurality of processors;
   an update unit configured to, upon receiving an input of a command sequence including two or more commands, wherein each of the two or more commands is to be output to a storage area, update the load information for each processor based on a load applied by a command currently being executed to the storage area corresponding to the processor;
   a determination unit configured to determine whether two consecutive commands of the command sequence are of a same type and whether respective addresses for accessing the storage areas of the consecutive commands have continuity,
   a selection unit configured to:
   if the determination unit determines that the two consecutive commands of the command sequence are of the same type and respective addresses for accessing the storage areas of the two consecutive commands have continuity, select a processor, of the plurality of processors, as an allocation destination of a second command, that is immediately after a first command of the two consecutive commands, that is a same processor as previously selected for the first command, and
   if the determination unit determines that the two consecutive commands of the command sequence are not of the same type or respective addresses for accessing the storage areas of the two consecutive commands do not have continuity, select a processor, of the plurality of processors, as an allocation destination of the second command based on the load information of the plurality of processors; and
   an output unit configured to output the second command to the processor selected by the selection unit.

2. The control apparatus according to claim 1,
   wherein the apparatus includes a storage unit configured to store association information correlating identification information of a specified processor out of the plurality of processors with identification information of a specified storage area out of the storage areas being an access destination of the specified processor,
   wherein the determination unit is further configured to: by referring to the association information, determine whether identification information of the storage area being an access destination of the second command matches identification information of the specified storage area for the first command, and wherein the selection unit selects the specified processor in a case the determination unit determines the identification information of the storage area being an access destination of the second command matches the identification information of the specified storage area.

3. The control apparatus according to claim 1, wherein the apparatus includes a storage unit configured to store association information correlating identification information of a specified processor out of the processors with a size of a command outputted by the specified processor to an access destination, wherein the determination unit is further configured to, by referring to the association information, determine whether a size of the second command matches the size of a command outputted by the specified processor to an access destination, and wherein the selection unit selects the specified processor in a case the determination unit determines a size of the second command matches a size of a command outputted by the specified processor.

4. A control method for a control apparatus configured to control a plurality of processors, corresponding to a plurality of storage areas that are arranged at an interface, for accessing the plurality of storage areas, the control apparatus including a memory storing respective load information for each of the plurality of processors, the method comprising:

updating, upon receiving an input of a command sequence including two or more commands, wherein each of the two or more commands is to be output to a storage area, the load information for each of the plurality of processors based on a load applied by a command currently being executed to the storage area corresponding to the processor;

determining whether two consecutive commands of the command sequence are of a same type and whether respective addresses for accessing the storage areas of the consecutive commands have continuity, selecting, if the determination unit determines that the two consecutive commands of the command sequence are of the same type and respective addresses for accessing the storage areas of the consecutive commands have continuity, a processor, of the plurality of processors, as an allocation destination of a second command, that is immediately after a first command of the two consecutive commands, that is a same processor as previously selected for the first command, and selecting, if the determination unit determines that the two consecutive commands of the command sequence are not of the same type or respective addresses for accessing the storage areas of the two consecutive commands do not have continuity, select a processor, of the plurality of processors, as an allocation destination of the second command, based on the load information of the plurality of processors; and outputting the second command to the processor selected by the selecting.

5. The control method according to claim 4, wherein the apparatus includes a storage unit configured to store association information correlating identification information of a specified processor out of the plurality of processors with identification information of a specified storage area out of the storage areas being an access destination of the specified processor, wherein the method further comprises the steps of: determining, by referring to the association information, whether identification information of the storage area being an access destination of the second command matches identification information of the specified storage area for the first command, and wherein, in the selecting, the control apparatus selects the specified processor in a case the determination process determines the identification information of the storage area being an access destination of the second command matches the identification information of the specified storage area.

6. The control method according to claim 4, wherein the apparatus includes a storage unit configured to store association information correlating identification information of a specified processor out of the plurality of processors with a size of a command outputted by the specified processor to an access destination, wherein the method further comprises the steps of:

determining, by referring to the association information, whether a size of the second command matches the size of a command outputted by the specified processor to an access destination, and wherein, in the selecting, the control apparatus selects the specified processor in a case the control apparatus determines a size of the second command matches a size of a command outputted by the specified processor.

7. The control method according to claim 4, wherein the type of a command is one of a read and a write command.

8. The control apparatus according to claim 1, wherein the type of a command is one of a read and a write command.

* * * * *